WILLIAM A. LORENZ.
Improvement in Extension Lathe Carrier.
No. 125,203.                                              Patented April 2, 1872.
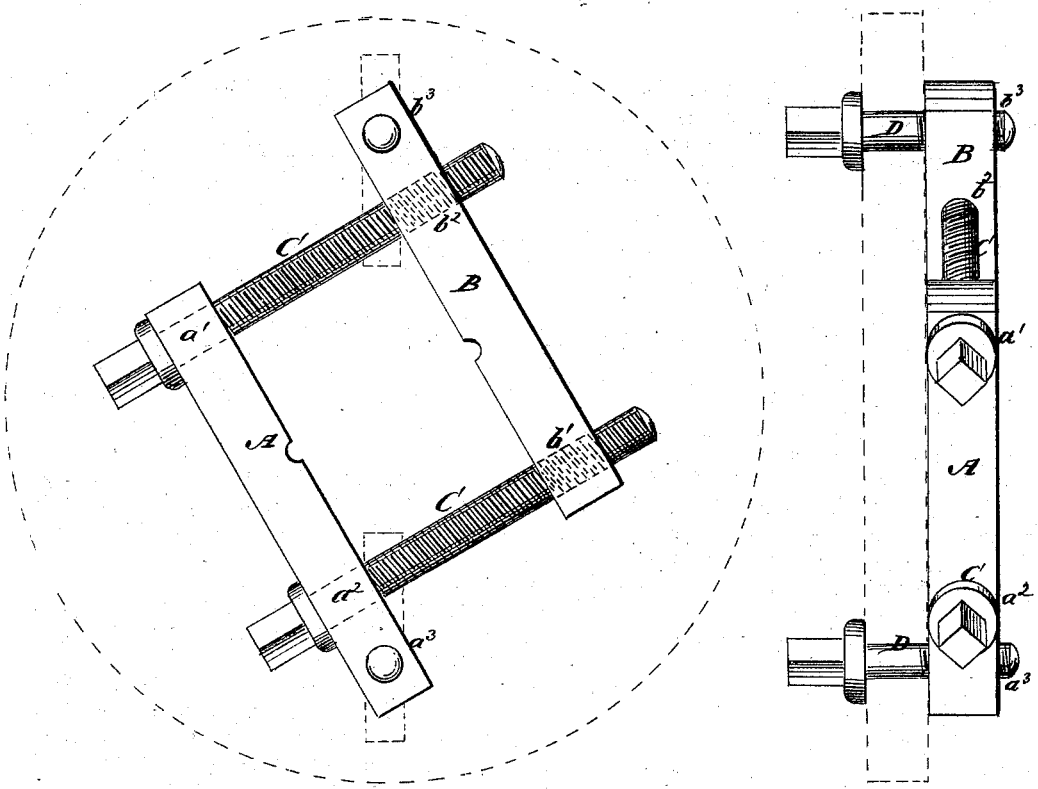

125,203

UNITED STATES PATENT OFFICE.

WILLIAM A. LORENZ, OF NEWARK, NEW JERSEY.

IMPROVEMENT IN EXTENSION-LATHE CARRIERS.

Specification forming part of Letters Patent No. 125,203, dated April 2, 1872.

Specification describing an Improvement in Extension-Lathe Carrier, invented by WILLIAM A. LORENZ, of Newark, in the county of Essex and State of New Jersey.

Figure 1 is a front view of my improved extension-lathe carrier. Fig. 2 is a side view of the same. Fig. 3 represents the tail. Fig. 4 represents a longer clamping-screw.

My invention has for its object to furnish an improved extension carrier for securing work to the face-plate of a lathe for turning, boring, or other purposes, which shall be simple in construction and convenient and reliable in use; and it consists in the construction and combination of the various parts of the carrier, as hereinafter more fully described.

A B are two bars, the one, as A, of which has two holes, $a^1$ $a^2$, formed through it to receive the bodies of two screws, C, which screw into screw-holes $b^1$ $b^2$ in the other bar B to hold the work. The holes $a^1$ $b^1$ are formed in the ends of the bars A B, and the holes $a^2$ $b^2$ are formed at a little distance from the other ends of said bars A B. The bars A B are arranged with their longer ends projecting in opposite directions, as shown in Fig. 1. In the longer ends of the bars A B are formed screw-holes $a^3$ $b^3$, at right angles with the holes $a^1$ $b^1$ $a^2$ $b^2$, as shown in Figs. 1 and 2, to receive the screws D by which the carrier is secured to the face-plate of the lathe. The screws D pass through slots in the opposite sides of the face-plate of the lathe, and which are in line with each other and with the lathe center.

When the carrier is used as a common extension carrier, the tail E is used, which is made with a long head to enter one of the slots in the face-plate, and thus carry the work. When the carrier is used as an extension carrier on line lathe center, the long screws F are used, which are passed through the slots in the face-plate, and are screwed into the holes $a^3$ $b^3$, so as to hold the work back to the said face-plate.

With this construction the screw-holes $a^3$ $b^3$, as the carrier is expanded and contracted, will always be in line with the lathe center.

The first and most important object of the carrier is its use as a tool for holding shafting and back to face-plate of lathe by means of long screws passing through slots of face-plate, the shaft meanwhile resting on a steady-rest at one end, and on the live-center of lathe at the other. The lathe-center is the governing center-point. The screws are screwed up until they just tighten the shaft on its center-point. It never springs out of center when held in this manner. In this position the screws act as tails to carry the shaft around. Drills or tools of suitable shape can then be brought to bear upon end of shaft.

In ordinary machine-shop practice the common dog is tied with a string or belt-lace back to the face-plate, or a clamp with bolts (such as are used for holding-wheels in boring-lathes) is put before the dog, and fastened back to face-plate against the dog by bolts. My extension carrier dispenses with these methods, and does its part quickly and in a workmanlike manner.

Figs. 1 and 2 represent the carrier used without the lathe-center, for holding rough short work to be bored. An exact center is not required here, although it can easily be found by bringing the dead-center up to the work. It will be seen that the only difference is the use of short instead of long screws. The latter would project and be in the way. Hence it will be perceived that the face-plate does not form a necessary part of the tool.

Having thus described my invention, I claim as new and desire to secure by Letters Patent—

The bars A B, having holes $a^1$ $b^1$ $a^2$ $b^2$ $a^3$ $b^3$ formed in them, the screws C and screws D or F, in combination with each other, substantially as herein shown and described, and for the purposes set forth.

WILLIAM A. LORENZ.

Witnesses:
   CHAS. BATCHELOR,
   JOHN LEES.